(12) United States Patent
Stolt et al.

(10) Patent No.: US 7,921,969 B2
(45) Date of Patent: Apr. 12, 2011

(54) RESTRICTION OF OUTPUT OF ELECTRICAL DRIVE AND PROTECTION OF AN ELEVATOR

(75) Inventors: Lauri Stolt, Helsinki (FI); Tuukka Kauppinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/751,501

(22) Filed: Mar. 31, 2010

(65) Prior Publication Data

US 2010/0187046 A1    Jul. 29, 2010

Related U.S. Application Data

(63) Continuation of application No. PCT/FI2008/000106, filed on Sep. 25, 2008.

(30) Foreign Application Priority Data

Oct. 1, 2007   (FI) ..................................... 20070745

(51) Int. Cl.
  *B66B 1/34*   (2006.01)
(52) U.S. Cl. ....................................... 187/391; 187/293
(58) Field of Classification Search .................. 187/247, 187/391–393, 293, 295, 296, 297; 361/23, 361/30, 31, 33; 318/432, 434
  See application file for complete search history.

(56) References Cited

U.S. PATENT DOCUMENTS

| | | | |
|---|---|---|---|
| 3,941,214 A | 3/1976 | Young et al. | |
| 4,220,221 A * | 9/1980 | Gingrich | 187/295 |
| 4,751,984 A * | 6/1988 | Williams et al. | 187/293 |
| 5,276,292 A * | 1/1994 | Goto et al. | 187/288 |
| 5,880,416 A * | 3/1999 | Colby et al. | 187/393 |
| 6,283,252 B1 * | 9/2001 | Lee | 187/291 |
| 6,446,760 B1 * | 9/2002 | Lisi | 187/391 |
| 6,910,553 B1 | 6/2005 | Lobbe et al. | |
| 6,965,212 B1 | 11/2005 | Wang et al. | |
| 7,637,353 B2 * | 12/2009 | Shibata | 187/293 |
| 7,658,268 B2 * | 2/2010 | Kinpara et al. | 187/293 |
| 2002/0101221 A1 | 8/2002 | Stefanovic et al. | |
| 2005/0212471 A1 | 9/2005 | Patel et al. | |
| 2007/0284196 A1 * | 12/2007 | Sakai et al. | 187/305 |
| 2008/0277209 A1 * | 11/2008 | Piedra et al. | 187/296 |

FOREIGN PATENT DOCUMENTS

| | | | |
|---|---|---|---|
| JP | 02286584 A | * | 11/1990 |
| JP | 2002-58293 | | 2/2002 |
| JP | 2003-9598 | | 1/2003 |
| WO | WO 97/30510 | | 8/1997 |

* cited by examiner

*Primary Examiner* — Jonathan Salata
(74) *Attorney, Agent, or Firm* — Birch, Stewart, Kolasch & Birch, LLP.

(57) ABSTRACT

A method for restricting the output of an electrical drive and for protection of an elevator are provided. The electrical drive includes a motor as well as a power supply appliance of the motor. In the method for restricting the output of an electrical drive the stator voltage vector is restricted to its limit value restricting only the component of the stator voltages in the direction of the q axis. In the protection of an elevator, the elevator includes a machinery brake, a safety brake of the elevator car, and also an electrical drive. The protection method includes determination of at least one limit value, restriction of the output of the electrical drive on the basis of at least one determined limit value, and restriction of the movement of the elevator car on the basis of at least on determined limit value.

11 Claims, 5 Drawing Sheets

RESTRICTION OF OUTPUT OF ELECTRICAL DRIVE AND PROTECTION OF AN ELEVATOR

CROSS REFERENCE TO RELATED APPLICATIONS

Figure 1:
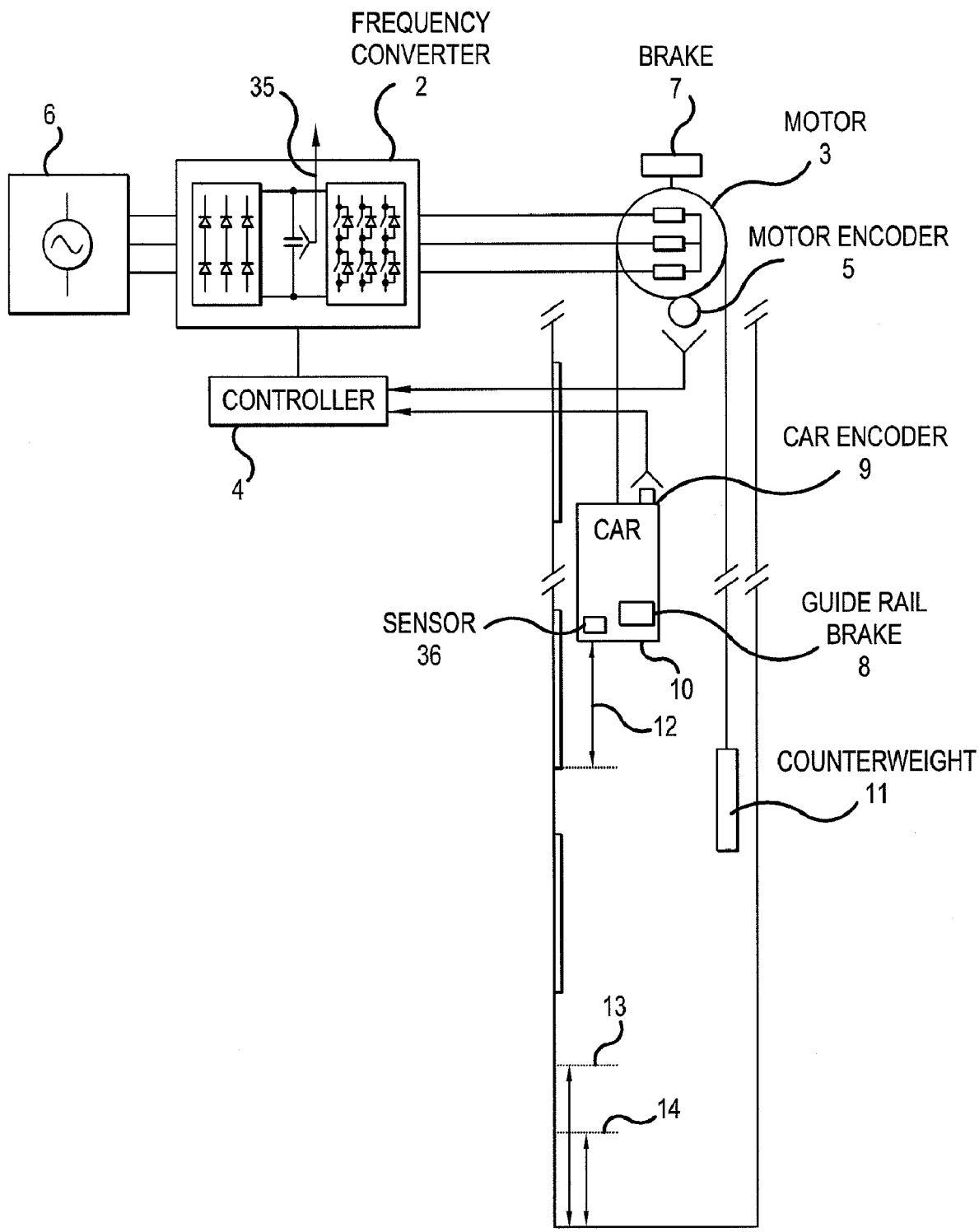

This application is a Continuation of PCT International Application No. PCT/FI2008/000106 filed on Sep. 25, 2008, which claims the benefit of the Finnish Non-Provisional Application No. 20070745 filed on Oct. 1, 2007. The entire contents of all of the above applications is hereby incorporated by reference.

FIELD OF THE INVENTION

The invention is directed to a method for restricting the output of an electrical drive in an elevator system.

PRIOR ART

In electrical drives the motor current is restricted e.g. by stopping the operation of the electrical drive in an overcurrent situation. The maximum of the motor voltage in electrical drives is determined according to the maximum output voltage of the power supply appliance of the motor, and the ending of the voltage is seen via the distortion of the output voltage also as distortion of the motor current, which has caused vibration of the motor and noise problems.

When restricting the current or the voltage of an elevator motor in elevator drives, the operation of the elevator drive is stopped e.g. on the basis of overcurrent monitoring or on the basis of speed monitoring. In this case the speed monitoring is activated when the reference value of the speed of the elevator car and the speed measurement differ from each other e.g. by five percentage points.

PURPOSE OF THE INVENTION

The purpose of this invention is to disclose a restriction of the output of an electrical drive as well as a protection of an elevator integrated into the restriction of the output of an electrical drive. As presented in the invention, the operation of the electrical drive, such as of an elevator drive, continues in a controlled manner if the current or the voltage of the elevator motor is restricted. As further presented in the invention, restriction of the current or of the voltage does not cause distortion of the motor current.

CHARACTERISTIC FEATURES OF THE INVENTION

The method for restricting the output of an electrical drive according to the invention is characterized by what is disclosed in the claims. The protection of an elevator according to the invention is characterized by what is disclosed in the claims. The method according to the invention for protecting an elevator is characterized by what is disclosed in the claims. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

In the protection of an elevator according to the invention the elevator comprises a machinery brake, a safety brake of the elevator car, and an electrical drive, which electrical drive comprises an elevator motor and also a power supply appliance of the elevator motor. The protection of an elevator comprises: a determination of the limit value for the stator voltage and/or the stator current of the elevator motor; a restriction of the output of the electrical drive, in which the output of the electrical drive is restricted on the basis of the limit value for the stator voltage and/or stator current; at least one determination of the limit value for permitted movement of the elevator car; and also a restriction of the movement of the elevator car, in which the movement of the elevator car is restricted on the basis of at least one determined limit value for permitted movement. At least one limit value for permitted movement of the elevator car is determined at least partly on the basis of the limit value for the stator voltage and/or the stator current of the elevator motor, and the elevator car is fitted to move with a restricted movement during the aforementioned restriction of the movement of the elevator car.

In the method for protecting an elevator according to the invention: an electrical drive is fitted into the elevator, to which electrical drive an elevator motor and a power supply appliance of the elevator motor is fitted; a machinery brake and also a safety brake of the elevator car is fitted to the elevator; a limit value for the stator voltage and/or the stator current is determined; the output of the electrical drive is restricted on the basis of the limit value for the stator voltage and/or the stator current; and also a limit value for the permitted movement of the elevator car is determined; and the movement of the elevator car is restricted on the basis of the limit value for permitted movement; at least one limit value for the permitted movement of the elevator car is determined at least partly on the basis of the limit value for the stator voltage and/or the stator current of the elevator motor; and the elevator car is moved with a restricted movement during the aforementioned restriction of movement of the elevator car.

In one method according to the invention for restricting the output of an electrical drive the electrical drive comprises a motor and the power supply appliance of the motor. In the method according to the invention an unlimited stator voltage vector is determined; the length of the unlimited stator voltage vector is determined, and when the length exceeds the determined limit value for voltage, the length of the stator voltage vector is restricted essentially to its aforementioned limit value restricting only that component of the stator voltage which is perpendicular with respect to the rotor flux. Motor in this context refers generally to a polyphase alternating current motor, such as a synchronous motor. Power supply appliance of a motor in this context refers generally to an appliance with which the output of the motor can be controlled. This kind of appliance can be e.g. a frequency converter. Stator voltage vector refers generally to the stator voltage of the motor or to the reference value for voltage, which can be described in vector format. Unlimited stator voltage vector or stator current vector refers the stator voltage or the stator current set by the control of the motor according to its control principle or to reference value for the stator current or stator voltage, which is thus not limited with the restriction principle according to the invention.

In one method according to the invention an unlimited stator voltage vector is determined in the d, q coordinate system fixed to the rotor; the length of the unlimited stator voltage vector is determined, and when the length exceeds the determined limit value for voltage, the length of the stator voltage vector is restricted essentially to its aforementioned limit value restricting only the component that is in the direction of the q axis of the stator voltage. Determining the voltage vector and the current vector in the d, q coordinate system fixed to the rotor refers to describing the vector components in the moving coordinate system of the rotor, which is in itself prior art. Here the d axis of the coordinate system is determined as the direction of the magnetic flux of the rotor and the q axis is defined as perpendicular with respect to the magnetic flux of the rotor, in which case the q axis can also be called the torque axis. The q axis is in this case also parallel with its source voltage, which as the rotor moves is induced by the magnetic field produced by the rotor magnetization. When the voltage vector and the current vector A are restricted essentially to their limit value restricting only the component $A_q$ in the direction of the q axis of the vector, the total length $|A|$ of the vector is calculated from the component $A_d$ in the direction of the d axis as well as from the component $A_q$ in the direction of the q axis with the equation:

$$|A| = \sqrt{A^2_d + A^2_q}$$

and if the total length $|A|$ exceeds the limit value, the component $A_q$ in the direction of the q axis is reduced such that the total length $|A|$ of the vector remains essentially at the magnitude of the aforementioned limit value. The aforementioned voltage vector or current vector can also be fixed to the stator coordinate system, in which case the position of the voltage vector or current vector is however determined in the same way on the basis of the position of the magnetic flux of the rotor, and restriction occurs in the same way perpendicularly with respect to the magnetic flux of the rotor.

In one embodiment of the invention the aforementioned limit value $U_{limit}$ of voltage is selected by means of the intermediate circuit voltage $U_d$ of the power supply appliance of the motor according to the equation presented:

$$U_{limit} = \frac{U_d}{\sqrt{3}}$$

In one method according to the invention after the component in the direction of the q axis of the limited stator voltage is reduced to zero, the length of the stator voltage vector is restricted to essentially its limit value restricting only the component in the direction of the d axis of the stator voltage. Limited stator voltage refers to the reference value of the stator voltage or of the voltage, which is limited with the restriction principle according to the invention.

In one method according to the invention an unlimited stator current vector is determined in the d, q coordinate system fixed to the rotor; the length of the unlimited stator current vector is determined, and when the length exceeds the determined limit value for current, the length of the stator current vector is restricted essentially to its aforementioned limit value restricting only the component that is in the direction of the q axis of the stator current.

In one protection of an elevator according to the invention determination of the limit values comprises the determination of at least one limit value for the output of the electrical drive, and in the same connection the determination of at least one limit value for the permitted movement of the elevator car. The limit value for permitted movement refers to the limit value of permitted movement of some movement parameter of the elevator car, such as the limit value for the position, speed or acceleration of the elevator car.

The limit values for the output of one electrical drive according to the invention comprise the limit value for the length of the stator voltage vector, which limit value is determined using at least one of the following determination criteria:
on the basis of the machinery parameters of the motor
on the basis of the appliance parameters of the power supply appliance of the motor
on the basis of the determination of the network voltage or of the intermediate circuit voltage
on the basis of the determination of the speed of the motor
on the basis of the determination of the speed of the elevator car The machinery parameters of the motor refer here to the motor-specific parameters that can generally be measured from a motor, such as the stator resistance, rated output, rated current, rated voltage, rated speed or reactance at the rated speed, or the source voltage. The appliance parameters of the power supply appliance of the motor refer generally to the parameters expressing the accuracy of the capacity or power control of the power supply appliance, such as the current endurance or voltage endurance of power semiconductors, the switching losses or line losses of power semiconductors, the warm-up time constants of the power supply appliance, the accuracy of setting the current or the voltage, or distortion of the set current or set voltage of the power supply appliance. Network voltage refers to the voltage of the supply network of the elevator system. Intermediate circuit voltage refers to e.g. the voltage of the intermediate circuit of the frequency converter. The determination of the network voltage or of the intermediate circuit voltage refers to, for instance, the computational estimation of the voltages or the measurement of the voltages with some voltage measurement according to prior art. The intermediate circuit voltage can also in some cases be estimated on the basis of the measurement of the network current, or vice versa. Determination of the speed of the motor refers to estimation of the speed of the motor e.g. on the basis of an estimate of the source voltage of the motor, or if a synchronous motor is in question the speed of the motor can also be estimated e.g. on the basis of the current of the motor or the supply frequency of the voltage. Furthermore the speed of the motor can be measured e.g. by means of a tachometer or pulse encoder installed with tractive friction onto the rotating shaft of the motor or onto the frame of the motor. The speed of the elevator car can be determined e.g. by means of a tachometer or a pulse encoder installed between the guide rail of the elevator car and the elevator car, or e.g. by means of a tachometer or a pulse encoder fitted in connection with the rope pulley of the overspeed governor.

The limit values for the output of one electrical drive according to the invention comprise the limit value for the length of the stator current vector of the motor, which limit value is determined using at least one of the following determination criteria:
on the basis of the machinery parameters of the motor
on the basis of the appliance parameters of the power supply appliance of the motor
on the basis of the determination of the imbalance of the loading of the elevator
on the basis of the determination of the temperature of the motor or of the power supply appliance of the motor
on the basis of the determination of the temperature of the elevator shaft The determination of imbalance of the loading of the elevator refers e.g. to measuring the load of the elevator car with some prior-art load weighing sensor fitted in connection with the elevator car or with the roping of the elevator car, in which case the imbalance can be evaluated by means of both the aforementioned measurement of the loading of the elevator car and by means of the masses of the elevator car and the counterweight. The elevator according to the invention can however also be one without counterweight. The imbalance of the loading of the elevator can also be evaluated e.g. by determining the motor current or the motor torque, or the reference value of current or torque, that is needed to keep the elevator car in its position with the machinery brake open. The temperature of the motor or of the power supply appliance of the motor can be determined e.g. by calculation on the basis of the motor currents, or temperature sensors can be installed in the elevator motor or in the power supply appliance. In this case the temperature sensor can be fitted e.g. onto the stator of the elevator motor or onto the heat sink of the power semiconductors of the power supply appliance of the motor. The temperature of the elevator shaft can be determined e.g. by installing a temperature sensor in the elevator shaft.

In one protection of the elevator according to the invention at least one limit value for permitted movement of the elevator car is determined at least partly on the basis of at least one determined limit value for the output of the electrical drive. If, for example, the limit value of the stator voltage or the current of the motor is changed for some reason, such as e.g. when the network voltage decreases or the temperature of the motor increases, it is possible to determine a change in the permitted movement of the elevator car corresponding to the change in the limit value of the stator current or the stator voltage.

In one protection of an elevator according to invention at least one limit value for permitted movement of the elevator car is determined at least partly on the basis of the determination of imbalance of the loading of the elevator.

One protection of an elevator according to the invention comprises a determination of the movement of the elevator car. The restriction of movement of the elevator car is in this case fitted to compare the determined value of the movement of the elevator car to the limit values for permitted movement of the elevator car and when the determined value of movement of the elevator car deviates outside the range defined by the limit values for permitted movement, the protection of the elevator is fitted to activate the emergency stop. In this case it is also possible to activate emergency stops of different levels according to the severity of the problem detected. In one embodiment of the invention in this case at least the machinery brake and possibly also the safety brake of the elevator car is activated and also at the same time the power supply to the motor is prevented e.g. by opening the main circuit of the power supply appliance of the motor or by otherwise preventing the operation of the power supply appliance such as by disconnecting the control of the controllable switches of the power supply appliance. Activation of the machinery brake or of the safety brake of the elevator car means in this context controlling them into a braking state. In another embodiment of the invention it is also possible to perform an emergency stop by controlling the elevator car to stop with the electrical drive in a situation where a detected problem does not require stopping the elevator car with a mechanical brake.

In one protection of the elevator according to the invention the limit values for permitted movement of the elevator car comprise first limit values, with which a first range of permitted movement is set, as well as second limit values, with which a second range of permitted movement is set. The second range of permitted movement is in this case defined to be closer to the extreme limits of safe movement in the elevator shaft than the first range of permitted movement. When the determined value of movement of the elevator car deviates outside the first range of permitted movement, the protection of the elevator is fitted to activate the machinery brake, and when the determined value of movement of the elevator car further deviates outside the second range of permitted movement, the protection of the elevator is fitted to activate the safety brake of the elevator car.

In one method according to the invention the limit values, with their determination criteria, for the output of the electrical drive are determined, and also at least one limit value for permitted movement of the elevator car is determined at least partly on the basis of at least one limit value for the output of the electrical drive.

In one method according to the invention at least one limit value for permitted movement of the elevator car is determined at least partly on the basis of the determination of imbalance of the loading of the elevator.

In one method according to the invention the movement of the elevator car is determined; the movement of the elevator car is compared to the limit values for permitted movement of the elevator car and when the determined value deviates outside the range defined by the limit values for permitted movement, the emergency stop is activated.

In one method or protection according to the invention at least one aforementioned limit value is formed from a plurality of instantaneous limit values that are consecutive to each other or can be described as a continuous limit value curve in relation to time.

In the method or the protection according to the invention the aforementioned electrical drive can also be intended to move the transport appliance of a transport system. A transport appliance refers in this context to a part of a transport system, which is used to move passengers or goods. This kind of transport system can be, for instance, an elevator system, an escalator system, a travelator system or a crane system.

One motor according to the invention is a synchronous motor, such as a permanent-magnet motor.

Movement of the elevator car refers to e.g. a change in the location of the elevator car, the speed of the elevator car, the acceleration of the elevator car and the deceleration of the elevator car.

ADVANTAGES OF THE INVENTION

With the invention at least one of the following advantages is achieved:
- When the output of the electrical drive is restricted as presented in the invention, the voltage or the current of the motor does not distort, in which case the torque of the motor does not distort either, and in this case it is possible to avoid the noise problems and vibration problems of prior art.
- When the limit values for the output of the electrical drive are determined on the basis of the machinery parameters or of the appliance parameters of the power supply appliance of the motor, it is possible to prevent overloading of the motor or of the power supply appliance and at the same time to ensure that the operation of the electrical drive continues in a controlled manner.
- When the limit value for the length of the stator voltage vector is determined on the basis of the movement of the elevator car or, for instance, on the basis of the speed of the elevator motor, it is possible to restrict movement of the elevator car to a safe range of movement. If a limit value is determined on the basis of a comparison of the speed of the motor and the movement of the elevator car, it is possible to determine a limit value on the basis of a determination of movement that is doubly verified, which improves the reliability of the determination of the limit value.

When the limit value for the length of the stator voltage vector is determined on the basis of the determination of the network voltage or of the intermediate circuit voltage of the power supply appliance, it is possible to prevent distortion of the output voltage of the power supply appliance e.g. when the network voltage decreases.

When the limit value for the length of the stator current vector of the motor is determined based on the imbalance of the loading of the elevator, the limit value can be reduced e.g. with a balancing load of the elevator.

When the limit value for the length of the stator current vector is determined on the basis of the determination of the temperature of the motor or of the power supply appliance of the motor, the aforementioned limit value can be reduced e.g. in a situation in which the temperature of the motor or of the power supply appliance rises. On the basis of the reduction of the limit value for the length of the stator current vector based on the temperature of the motor, it is possible in this case to prevent overloading of the motor or of the power supply appliance.

When the limit value for the permitted movement of the elevator car is determined on the basis of a determined limit value for the output of the electrical drive, it is possible to ensure that the movement of the elevator car continues in a controlled manner also when restricting the output of the electrical drive. The permitted movement of the elevator car can be restricted according to the operating situation determined by the restriction of the voltage or of the current of the elevator motor, in which case e.g. when the current or the voltage is restricting movement of the elevator motor in the heavy load direction, deceleration of the movement of the elevator car can be permitted by setting the range of permitted movement of the elevator car to cover the aforementioned lower speed range.

When the limit value for permitted movement of the elevator car is determined also on the basis of the determination of imbalance of the loading of the elevator, the accuracy of the determination of the limit value for permitted movement can be improved in a situation in which the output of the electrical drive is restricted. In addition the heavy loading drive direction of the movement of the elevator motor can be determined from the imbalance of the loading, and the information can be used in the determination of the limit values for permitted movement.

When the limit values for the permitted movement of the elevator car are determined on the basis of the output of the electrical drive as presented in the invention, it is possible to accurately determine the safe movement of the elevator car in different operating situations of the electrical drive. The limit values for permitted movement can comprise a number of limit values, which determine the distance of the permitted movement of the elevator car to the extreme limits for safe movement in the elevator shaft. If for example the elevator car arrives in the proximity of the end zone of the elevator shaft, the protection of the elevator can activate emergency stops of different levels based on different exceedances of the limit values for permitted movement. Depending on the limit values for permitted movement and on the position of the elevator car in the elevator shaft, the protection of the elevator can activate an emergency stop, in which case the elevator car is stopped with a deceleration ramp under the control of the electrical drive; the protection can also activate the machinery brake to stop the elevator car, or when the movement of the elevator car continues further towards the extreme limits for safe movement, the protection can activate the safety brake of the elevator car, such as the wedge brake or the guide rail brake. When the output of the electrical drive is restricted during a run of the elevator and the speed of the elevator car in this case changes, the protection of the elevator can activate different levels of emergency stops when the speed of the elevator car decreases or increases outside the different ranges of permitted movement. Likewise when the output of an electrical drive is restricted the limit values of permitted movement can be changed during the run e.g. such that deceleration of the speed of the elevator car is permitted, in which case the elevator does not necessarily make an emergency stop when the speed decelerates but instead drives normally, which improves the service of the elevator.

PRESENTATION OF DRAWINGS

Figure 2:
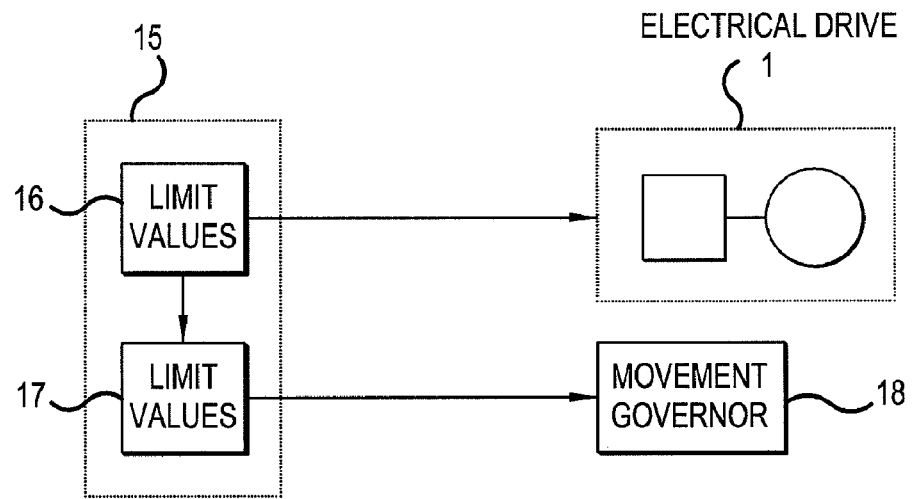
Figure 3:
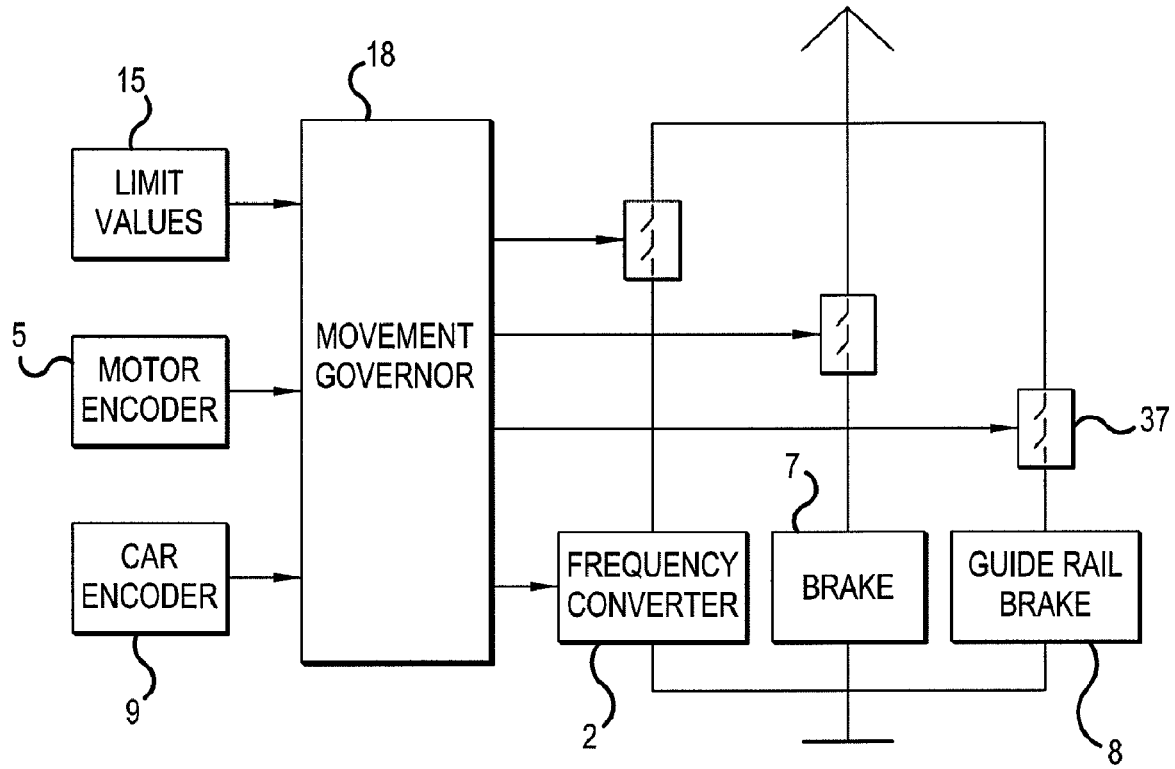
Figure 4:
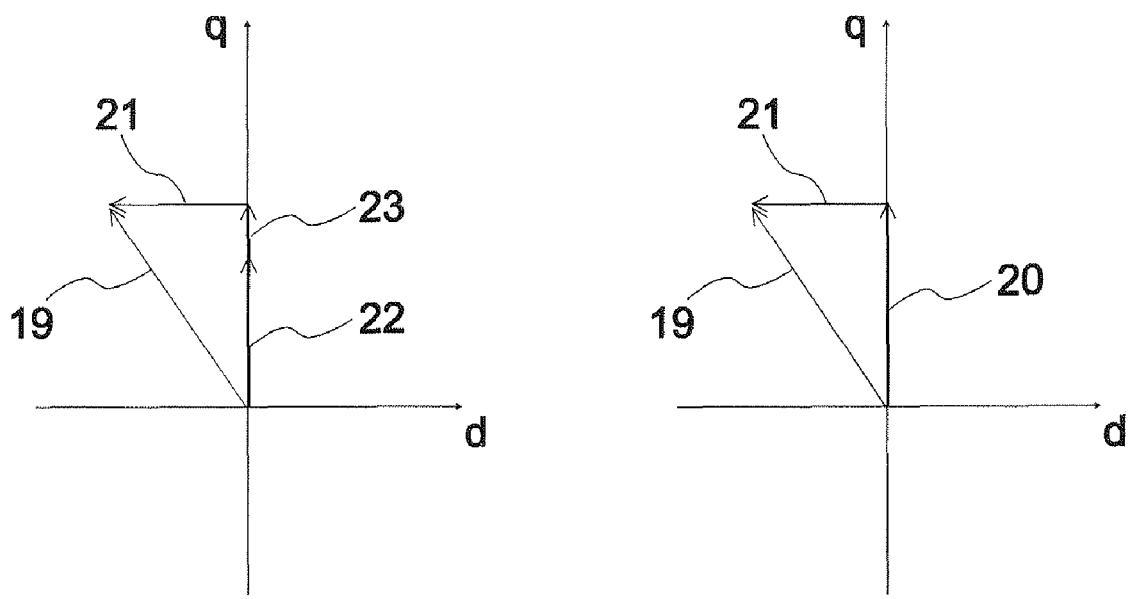
Figure 6:
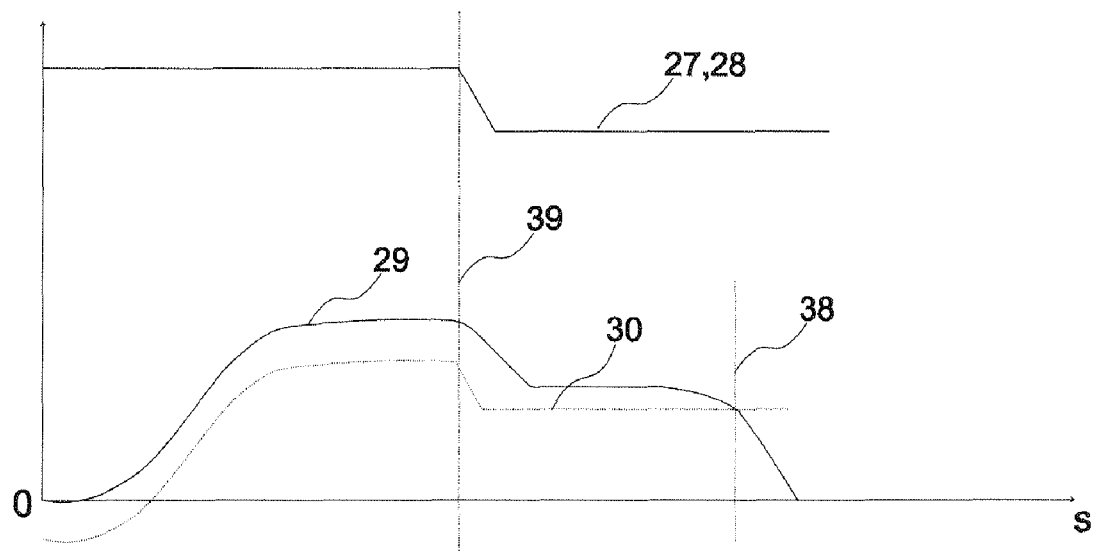
Figure 7:
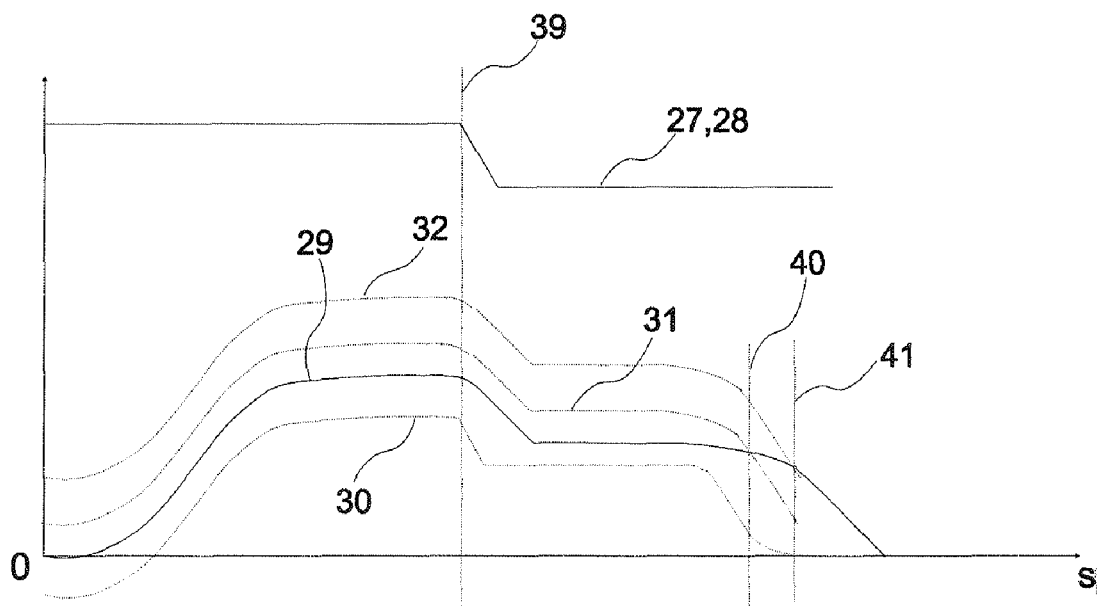
Figure 8:
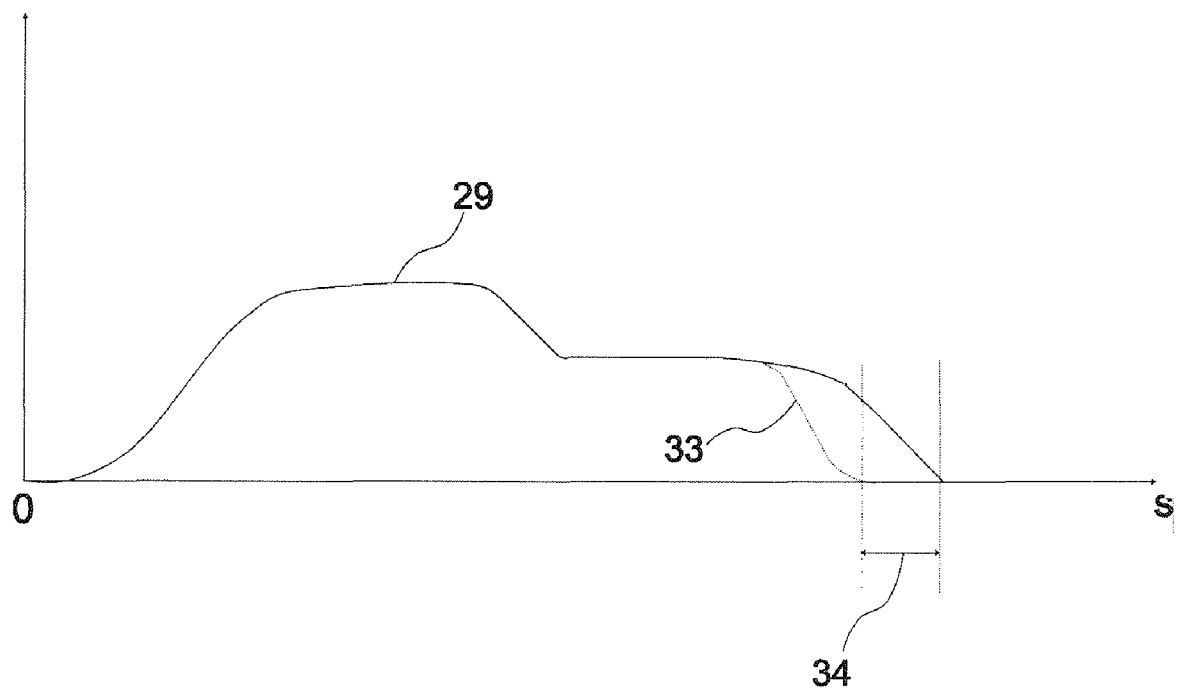

In the following, the invention will be described in more detail by the aid of a few examples of its embodiments with reference to the attached drawings, wherein FIG. 1 presents an elevator system according to the invention FIG. 2 presents a determination of the limit values according to the invention FIG. 3 presents a restriction of movement according to the invention FIG. 4 presents the stator voltage defined in a system of d, q coordinates presents the stator current defined in a system of d, q coordinates FIG. 6 presents the determined speed of the elevator car and also the limit values for permitted movement when restricting the output of the electrical drive FIG. 7 presents the determined speed of the elevator car and also the limit values for permitted movement when restricting the output of the electrical drive FIG. 8 presents the determined speed of the elevator car and also the determination criteria of the limit value for permitted movement FIG. 1 presents an elevator system in which a protection of the elevator according to the invention can be fitted. The elevator motor 3 is here a three-phase synchronous motor, the rotor of which comprises permanent magnets. Power is supplied to the elevator motor 3 with a frequency converter 2 from a network supply 6. The elevator motor moves the elevator car 10 and the counterweight 11 in the elevator shaft via elevator ropes connected mechanically to the traction sheave of the elevator motor 3. The control 4 of the frequency converter sets the speed of the elevator motor by means of the speed measurement 5 of the motor and/or by means of the speed measurement 9 of the elevator car. The speed of the motor is measured with a motor encoder 5 fitted with tractive friction to the rim of the traction sheave, and the speed of the elevator car is measured with a car encoder 9 connected to the guide rail of the elevator car. The loading of the elevator car can be measured with the load weighing device sensors 36 of the car. The movement of the elevator car can, if necessary, be stopped with the machinery brake 7 connected to the traction sheave or with the guide rail brake connected to the guide rail of the elevator car. Limit values for permitted movement are determined in the elevator shaft e.g. in the proximity 12 of the landings, and also in the proximity 13, 14 of the ends of the elevator shaft.

FIG. 2 presents a determination 15 of the limit values according to the invention. The aforementioned determination of the limit values comprises the determination 16 of the limit values for the output of the electrical drive, as well as the determination 17 of the limit values for the permitted movement of the elevator car derived from this. The determination 15 of the limit values determines the limit values of the output 1 of the output of the electrical drive and also the limit values of the restriction 18 of movement of the elevator car. If the limit values for the output of the electrical drive are changed, the limit values for the permitted movement of the elevator car also change correspondingly. For example when the network supply voltage 6 decreases the limit value 27 for the stator voltage of the motor is reduced correspondingly, in which case distortion of the supply voltage of the motor is prevented, and at the same time noise and vibration problems resulting from this are prevented. In this case when the network voltage 6 decreases the drive quality of the elevator remains good, even though the speed of the elevator car in the heavy load drive direction decelerates. When the limit values for permitted movement of the elevator car are changed correspondingly to the change in the limit value for the stator voltage, the range of permitted movement for smaller speeds is expanded, in which case it is possible to drive in a controlled manner with the elevator also when the speed is restricted in the drive direction of heavy loading owing to the restriction of stator voltage. Correspondingly, if the limit value 28 for stator current is reduced e.g. as a result of warming of the motor, the limit value for permitted movement is changed according to the change in the limit value for the stator current.

FIG. 3 presents a restriction of movement according to the invention. The restriction of movement here comprises an unintended movement governor 18, which is formed from an electrical unintended movement governor circuit. The unintended movement governor 18 restricts the movement of the elevator car according to the set limit values 15 for permitted movement. The unintended movement governor 18 reads the movement signal of the elevator car 10 from the car encoder 9 and also the movement signal of the elevator motor from the motor encoder 5. These encoders give a pulse-shaped signal at constant angle intervals as the encoder rotates. The unintended movement governor 18 compares the movement signal of the car encoder that it reads to the movement signal of the motor encoder. In this case it is possible with the comparison of the movement signals to detect e.g. slipping of the ropes of the elevator car on the traction sheave, or a breakage of the ropes. A confirmed speed signal is obtained as the result of the comparison of the movement signals. The unintended movement governor 18 also determines the position of the elevator car in the elevator shaft by integrating the pulses of the car encoder 9. The determined position data is corrected on the basis of the position data of the position sensors of the floor level. The unintended movement governor 18 compares the confirmed movement signal to the limit values 13,14,30, 31,32 for permitted movement of the elevator car and when the movement of the elevator car deviates outside the range defined by the limit values for permitted movement, the unintended movement governor activates emergency stops of different levels. If, on the basis of the determination of position, the elevator car is positioned in the middle of the elevator shaft, the unintended movement governor sends to the frequency converter 2 a control command, on the basis of which the frequency converter stops the elevator car in a controlled manner with a deceleration ramp. If, on the basis of the determination of the position, the elevator car is positioned in the proximity of the end zone of the elevator shaft, when the distance from the end decreases to the first limit value 13 the unintended movement governor controls the machinery brake 7 by opening the coil of the machinery brake with the safety circuit-breaker 37 of the power supply circuit and additionally disconnects the three-phase power supply circuit of the frequency converter 2 at all poles with a similar safety circuit-breaker 37. Safety circuit-breaker refers here to a controllable circuit-breaker, which disconnects the power supply circuit at all poles but at least at two different points. Disconnection of the three-phase supply at all poles however requires three disconnector switches. This kind of safety circuit-breaker can comprise e.g. at least two controllable mechanical switches connected in series, or it can also comprise at least two corresponding semiconductor switches integrated into the power supply circuit to be disconnected. If despite the engagement of the machinery brake the elevator car further continues its journey towards the end of the elevator shaft, when the distance of the elevator car from the end decreases to the second limit value 14, the unintended movement governor 18 controls in addition the guide rail brake 8 of the elevator car by disconnecting the power supply circuit of the coil of the guide rail brake with the safety circuit-breaker 37.

FIG. 4 presents the stator voltage determined in the d, q coordinate system fixed to the rotor. The axis of magnetization of the rotor is in the direction of the d axis. In this case the source voltage 22 of the motor is in the direction of the q axis. Since in this embodiment of the invention the stator current is in the direction of the q axis $1_q$, the component 20 of the stator voltage in the direction of the q axis is formed from the source voltage 22 as well as from the voltage dissipation $R*1_q$ 23 of the stator resistance. The component 21 of stator voltage in the direction of the d axis is the control voltage $w*L*1_q$ needed to rotate the current vector of the stator, where w is the speed of rotation of the current vector of the stator and L is the inductance of the stator winding. The stator voltage 19 is determined as the resultant of the components that are in the direction of the d and q axes.

When the frequency converter 2 sets the stator voltage for setting the speed of the elevator motor 3, the stator voltage begins to distort e.g. when the network voltage 6 decreases. The aforementioned distortion is prevented by restricting the stator voltage to the set limit value. The length of the stator voltage vector 19 is measured, and the component 20 of the stator voltage in the direction of the d axis is restricted according to the limit value. At the same time the component 21 of the stator voltage in the direction of the d axis is permitted to change freely on the basis of the criteria for setting the speed of the motor. The limit value for the length of the stator voltage is in this case determined on the basis of the measurement of the intermediate circuit voltage of the frequency converter. Since the changeover switches of the frequency converter fitted to the supply of the motor connect the windings of the motor between the voltage potentials of the positive and the negative intermediate circuit busbar of the frequency converter, when the intermediate circuit voltage decreases also the voltage range of the stator voltage of the motor decreases. The limit value for the length of the stator voltage vector 19 is in this case determined to correspond to the maximum undistorted stator voltage.

Figure 5:
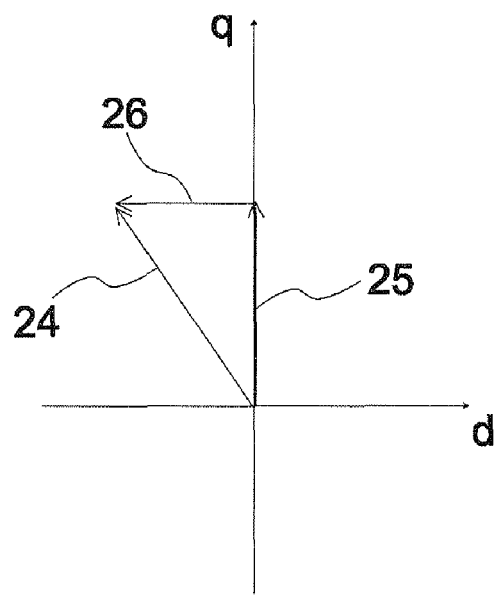

FIG. 5 presents the stator current 24 of the motor determined in the d, q coordinate system. In this embodiment of the invention the stator current comprises, in addition to the component 25 in the direction of the q axis, also a component 26 in the direction of the d axis, which is of the opposite direction to the rotor magnetization and thus weakens the rotor magnetization. In permanent-magnet motors this component 26 in the direction of the d axis is often set at zero, and thus permanent-magnet motors are not used in this kind of field weakening state. In a field weakening state the output voltage 22 of the motor weakens and in this case the stator voltage 19 needed also often decreases, in which case the possible operating speed range of the motor increases. The stator current is restricted to the set limit value 28. By reading the temperature sensors fitted to the stator of the motor the temperature of the motor is determined and when the temperature increases, the limit value 28 for the length of the stator current vector 24 is reduced. The length of the stator current vector is determined, and when the length exceeds the determined limit value the stator current vector is restricted to the limit value by restricting only the component 25 of the current in the direction of the q axis.

FIG. 6 presents the determined speed 29 of the elevator car and also the limit values 30 for permitted movement as a function of the position of the elevator car in the elevator shaft s when restricting the output of the electrical drive at the time 39, when the elevator is driving in the direction of heavy loading of the elevator motor. At the time 39 the output of the electrical drive is restricted e.g. as result of a reduction in the network voltage 6 or of warming of the motor 3. In this case correspondingly the limit value 27, 28 for the output of the electrical drive changes, and the limit value 30 for permitted speed of the elevator car also changes on the basis of the change in the limit value 27, 28 for the output of the electrical drive. As a result of the restriction of the output of the electrical drive, the determined speed 29 of the elevator car also starts to decrease. The elevator can in this case, however, continue its run in a controlled manner because the reduction of the limit value for permitted speed allows deceleration of the speed of the elevator car. At the time 38 however the speed of the elevator car decreases further below the lowermost limit value 30 for permitted speed, and the unintended movement governor 18 in this case stops the elevator by controlling the machinery brake 7 and also by disconnecting the power supply circuit of the frequency converter 2.

FIG. 7 further presents the determined value 29 of the speed of the elevator car and also the limit values 30, 31, 32 for permitted speed as a function of the position of the elevator car in the elevator shaft s when restricting the movement of the elevator car. In this embodiment of the invention the limit values for permitted speed determine three different ranges of permitted speed. The limit values 31 and 32 determine two different ranges for the maximum permitted speed of the elevator car. At the time 39 the limit values 27, 28 for the output of the electrical drive change and the limit values for permitted speed are changed based on the change in the limit values for the output of the electrical drive. The determined speed 29 of the elevator car decelerates, and the ranges of permitted speed change correspondingly, in which case the movement of the elevator car is controlled and the overspeed governor 18 reacts quickly to changes in the speed of the elevator car. When the elevator car approaches the terminal floor the motor 3 starts to decelerate the speed of the elevator car with the control of the frequency converter 2. Also the limit values for permitted speed decrease towards the terminal floor. If the speed of the elevator car does not in this case decelerate sufficiently, when the speed exceeds the first limit value 31 for permitted speed at the time 40 the overspeed governor 18 controls the machinery brake 7 and also disconnects the power supply circuit of the frequency converter 2. If the movement of the elevator car continues farther towards the end of the elevator shaft, the overspeed governor additionally controls the guide rail brake of the elevator car at the time 41.

FIG. 8 presents a graph of the determined speed of the elevator car in the situation according to FIG. 7. The line 33 presents the speed of the elevator car with deceleration according to the control of the frequency converter 2. The distance 34 describes in this case the deviation of the control of the frequency converter from the set target point for stopping. The limit values of the elevator shaft for permitted movement in the end zone 13, 14 of the elevator shaft are determined in the invention such that the braking distance of the machinery brake 7 of the elevator and if necessary of the safety brake of the car 8 is shorter than the distance from the end of the elevator shaft determined by the limit values for permitted movement. When calculating the limit values in this case the determined value of the speed of the elevator car must also be taken into account in the proximity of the end of the elevator shaft.

In one embodiment of the invention data about the imbalance of the loading of the elevator is also used in the determination of the limit values 13,14,30,31,32 for permitted movement of the elevator car. Imbalance is determined by measuring the load of the elevator car with the car load weighing device 36. The imbalance is typically at its greatest with a full car or with an empty car. The drive direction of heavy loading of the elevator motor varies in this case according to the loading such that with an empty elevator car the drive direction of heavy loading is downwards and with a full car upwards. The run direction of heavy loading can in this case be determined by measuring the load of the elevator car. The limit values for permitted movement of the elevator car are in this case determined separately according to the heavy and to the light drive direction, e.g. so that when the output of an electrical drive is restricted the speed of the elevator car decreases differently in the heavy drive direction than when driving in the drive direction of light loading.

The invention is not limited solely to the embodiments described above, but instead many variations are possible within the scope of the inventive concept defined by the claims below.

The invention claimed is:

1. Protection of an elevator, in which the elevator comprises a machinery brake, a safety brake of the elevator car, and an electrical drive, which electrical drive comprises an elevator motor and also a power supply appliance of the elevator motor, and which protection of an elevator comprises:

determination of the limit value for the stator voltage and/or the stator current of the elevator motor restriction of the output of the electrical drive, in which the output of the electrical drive is restricted on the basis of the limit value for the stator voltage and/or the stator current determination of at least one limit value for permitted movement of the elevator car restriction of the movement of the elevator car, in which the movement of the elevator car is restricted on the basis of at least one determined limit value for permitted movement wherein at least one limit value for permitted movement of the elevator car is determined at least partly on the basis of the limit value for the stator voltage and/or stator current of the elevator motor, and in that the elevator car is fitted to move with a restricted movement during the aforementioned restriction of the movement of the elevator car.

2. Protection of an elevator according to claim 1, wherein the determination of the limit values comprises:
   - determination of the limit value for stator voltage and/or the stator current of the elevator motor and in the same connection
   - determination of at least one limit value for permitted movement of the elevator car.

3. Protection of an elevator according to claim 1, wherein the limit value for the length of the stator voltage vector is determined using at least one of the following determination criteria:
   - on the basis of the machinery parameters of the motor
   - on the basis of the appliance parameters of the power supply appliance of the motor
   - on the basis of the determination of the network voltage or the intermediate circuit voltage
   - on the basis of the determination of the speed of the motor
   - on the basis of the determination of the speed of the elevator car.

4. Protection of an elevator according to claim 1, wherein the limit value for the length of the stator current vector is determined using at least one of the following determination criteria:
   - on the basis of the machinery parameters of the motor
   - on the basis of the appliance parameters of the power supply appliance of the motor
   - on the basis of the determination of the imbalance of the loading of the elevator
   - on the basis of the determination of the temperature of the motor or of the power supply appliance of the motor
   - on the basis of the determination of the temperature of the elevator shaft.

5. Protection of an elevator according to claim 1 wherein at least one limit value for permitted movement of the elevator car is determined at least partly on the basis of the determination of the imbalance of the loading of the elevator.

6. Protection of an elevator according to claim 1, wherein the protection of an elevator comprises a determination of the movement of the elevator car and in that a restriction of the movement of the elevator car is fitted to compare the determined value of movement of the elevator car to the limit values for permitted movement of the elevator car, and in that when the determined value of the movement of the elevator car deviates outside the range defined by the limit values for permitted movement, the protection of the elevator is fitted to activate the emergency stop.

7. Protection of an elevator according to claim 6, wherein the limit values for permitted movement of the elevator car comprise first limit values, with which a first range of permitted movement is set, as well as second limit values, with which a second range of permitted movement is set, and in that the second range of permitted movement is defined to be closer to the extreme limits of safe movement in the elevator shaft than the first range of permitted movement, and in that when the determined value of movement of the elevator car deviates outside the first range for permitted movement the protection of the elevator is fitted to activate the machinery brake, and in that when the determined value of movement of the elevator car deviates outside the second range for permitted movement the protection of the elevator is fitted to activate the safety brake of the elevator car.

8. Method for protecting an elevator, in which method:
   - an electrical drive is fitted into the elevator,
   - to which electrical drive an elevator motor and a power supply appliance of the elevator motor are fitted,
   - a machinery brake and a safety brake of the elevator car are fitted to the elevator
   - a limit value for stator voltage and/or stator current is determined
   - the output of the electrical drive is restricted on the basis of the limit value of stator voltage and/or stator current and
   - a limit value for permitted movement of the elevator car is determined
   - the movement of the elevator car is restricted on the basis of the limit value for permitted movement
   wherein:
   - at least one limit value for permitted movement of the elevator car is determined at least partly on the basis of the limit value of the stator voltage and/or the stator current of the elevator motor
   - the elevator car is moved with a restricted movement during the aforementioned restriction of the movement of the elevator car.

9. Method according to claim 8, wherein
   - at least one limit value for permitted movement of the elevator car is determined at least partly on the basis of the determination of the imbalance of the loading of the elevator.

10. Method according to claim 8, wherein:
    - the movement of the elevator car is determined
    - the movement of the elevator car is compared to the limit values for permitted movement of the elevator car and when the determined value deviates outside the range defined by the limit values for permitted movement,
    - the emergency stop is activated.

11. Method or protection according to claim 1, wherein at least one aforementioned limit value is formed from a plurality of instantaneous limit values that are consecutive to each other or can be described as a continuous limit value curve in relation to time.

* * * * *